March 21, 1939.  E. M. CLAYTOR  2,151,373
ELECTRICAL GENERATING SYSTEM
Filed March 21, 1938
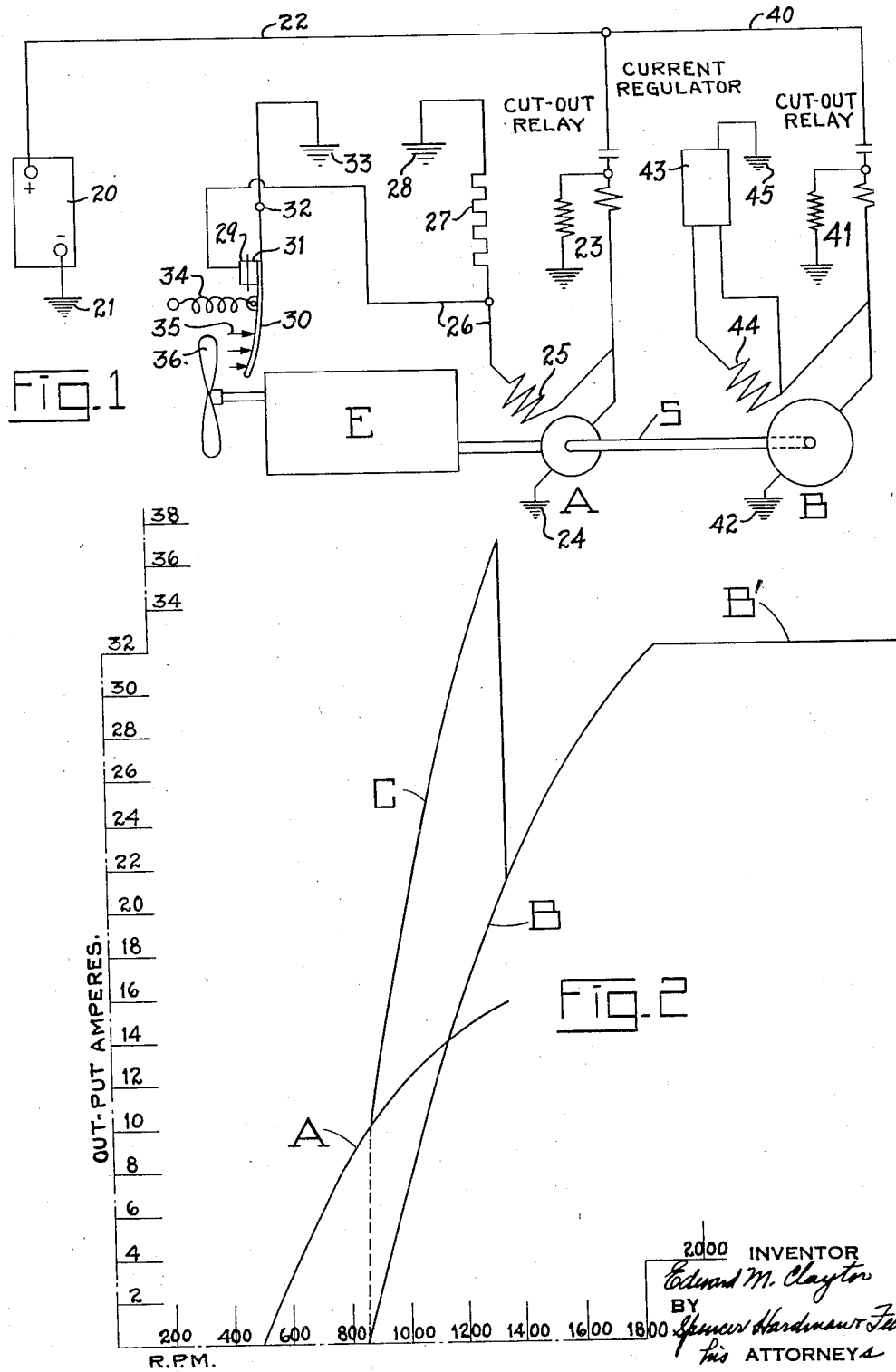

Patented Mar. 21, 1939

2,151,373

UNITED STATES PATENT OFFICE 2,151,373

ELECTRICAL GENERATING SYSTEM

Edward M. Claytor, Anderson, Ind., assignor to General Motors Corporation, Detroit, Mich., a corporation of Delaware Application March 21, 1938, Serial No. 197,046

3 Claims. (Cl. 290—50)

This invention relates to an electric generating system for use with automotive vehicles. There has been an increasing demand for higher generator output at high speed and also lower cut-in speed at which the cut-out relay connects the generator with the storage battery. Efforts have been made to improve the performance of generators by changing the design. The field frame of the automobile generators has been lengthened and the length of the stack of laminations comprising the armature has been increased in order to give the desired cut-in speed, and high output. When such a generator is operated at high output the brush life is not satisfactory.

I aim to secure low cut-in speed and satisfactory output at high speed and at the same time to secure satisfactory brush life. To attain these objects, I use a double generator system comprising a low output generator, hereinafter referred to as generator "A", having a high turn armature to give low cut-in speed, and a high output generator, hereinafter known as generator "B", having a low turn armature to give higher output and low sparking volts when operated at high speed. The low sparking volts will materially improve brush life. I provide an automatic switch operated preferably by an air current induced by the automobile engine cooling fan to make the generator A drop its load or materially reduce its load at some predetermined speed, for example, approximately 15 M. P. H. Generators A and B work together over a speed range from cut-in point of the large generator to the point where the air switch functions to drop the load on the small generator A.

As will be explained in more detail hereinafter, better high speed performance is obtained with the use of two moderate sized generators, because the sparking voltage at the commutators of the generators is much less than would be the case if a single large generator were used to give the same output at high speed.

Further objects and advantages of the present invention will be apparent from the following description, reference being had to the accompanying drawings wherein a preferred embodiment of the present invention is clearly shown.

In the drawings:

Fig. 1 is a wiring diagram of a system embodying the present invention.

Fig. 2 is a chart of curves illustrating the operation of the engine shown diagrammatically in Fig. 1.

Referring to Fig. 1, 20 designates a storage battery grounded at 21 and connected by wire 22 and cut-out relay 23 with generator A gounded at 24. The field circuit 25 of generator A is connected by wire 26 with a resistance 27 grounded at 28. Wire 26 is connected with stationary contact 29 of an air switch having a vane 30 carrying a contact 31 engageable with contact 29. The vane 30 is hinged at 32 and grounded at 33. A spring 34 urges the vane toward the left so that its contact 31 normally engages the contact 29. The vane 30 is caused to move by an air current from the cooling fan 36 of the automobile engine E which drives generator A. The air impinges against the vane and thereby produces a pressure indicated by arrows 35.

Wire 40 and cut-out relay 41 connect the wire 22 with generator B which is grounded at 42 and which has a regulator 43 for regulating the resistance in its field circuit 44 and which is grounded at 45. Generator B is also driven by engine E. Preferably they are driven at the same speed as by a common shaft S or coupled shafts.

Normally the air switch closes contacts 29 and 31 and field resistance 27 of generator A is short-circuited. Generator A has a relatively small high turn armature which gives low cut-in speed. The cut-out relay 23 closes about 500 R. P. M. generator speed and generator A gives an output represented by curve A of Fig. 2. Generator B, which gives greater output than generator A, has a relatively low turn armature in order to give high output and low sparking volts when operated at high speed. At about 850 R. P. M. generator speed, generator B cuts in. Its performance is represented by curve B of Fig. 2. Both generators A and B operate together between 850 and about 1350 R. P. M. generator speed. The performance of the two generators is represented by curve C of Fig. 2 which is the sum of the ordinates of curves A and B. Above 1350 R. P. M., which correspond approximately to 15 M. P. H. vehicle speed, the air pressure represented by arrows 35 on the air switch vane 30 overcomes the spring 34 and contacts 31 and 29 are separated, thereby cutting-in resistance 27 and materially reducing the output of generator A. Generator B will then carry the load above 1350 R. P. M. as indicated in Fig. 2. At some predetermined higher speed, the small generator A will cut-in again due to its voltage being such as to close the cut-out relay 23 again. Generator A will then continue to operate in parallel with generator B and assist it in carrying the load at high speeds. The horizontal line B' in Fig. 2 indicates the operation of the regulator 43.

In order to understand why I am able to reduce the sparking voltage at high speeds, attention should be given to the following considerations: The ratio of the top operating speed of a generator to its cut-in speed is a very definite index to successful high-load operation at high speed. The same fundamental principle that is involved in adjustable speed motor design is also involved in variable speed generator design. The constant voltage adjustable speed motor is limited to about 4 to 1 ratio of top speed to full field speed. When greater ratios are required, the designer offers a variable voltage system. In motor design, the field cannot be weakened too much, with full load on the armature, without distorting the flux in the commutating zone to such an extent that bad commutation is the result. The same thing happens in generators. True, the industrial motor is built for voltages much greater than required in automobile generators but also the interpole in the former is a great benefit in stabilizing the field flux in the commutating zone.

Considering the design of the automobile generator to be easier because of the low voltage, and to be more difficult because of the lack of interpoles, we find that a compromise of the two conditions makes it possible to produce a generator with a speed ratio of 5 to 1 instead of 4 to 1 found in industrial motor design. By a ratio of 5 to 1 we mean top full load speed divided by cut-in speed. For example, a generator having a cut-in speed of 800 R. P. M. will give satisfactory commutation and brush life at 4000 R. P. M. with maximum rated ampere output. These remarks apply to the shunt generator with current regulator set to give maximum rated current throughout the test which is presumed to be run at 4000 R. P. M.

With a fixed number of commutator bars, the sparking volts between bars will vary directly as the square of the turns per bar and directly as the current and directly as the speed.

If we assume that 60% of the sparking volts is developed in the slot, we may write the equation:

$$E_b^1 = E_b \times \frac{.4L + .6L^1}{L} \qquad (1)$$

Where $E_b$=sparking volts per bar for iron length L and $E_b^1$=sparking volts per bar for iron length $L^1$.

A general equation will now show the change in sparking volts per bar when turns per bar, armature current, speed, and length of stacking is changed.

$$E_b^1 = \left[\left(\frac{Tc^1}{Tc}\right)^2 \times \frac{A^1}{A} \times \frac{S^1}{S} \times \frac{.4L + .6L^1}{L}\right] \times E_b \qquad (2)$$

From equation (2), the sparking volts of generator A will be held to a safe value because $$\frac{S^1}{S}$$

is reduced as much or more than $$\left(\frac{Tc^1}{Tc}\right)^2$$

is increased.

The sparking volts of the large generator B is held to a safe value because $$\left(\frac{Tc^1}{Tc}\right)^2$$

is materially decreased while the current, speed, and armature stacking are not changed, i. e., $A^1 = A$; $S^1 = S$, and $L^1 = L$.

The double generator system permits the use of standard armature punchings and commutator, and it is believed that use of these standard parts would be more economical than building a special generator with larger diameter punching and commutator with a greater number of bars.

While the embodiment of the present invention as herein disclosed, constitutes a preferred form, it is to be understood that other forms might be adopted, all coming within the scope of the claims which follow.

What is claimed is as follows:

1. An electrical generating system for automotive vehicles comprising in combination a vehicle propelling engine, a generator driven by the engine and having a relatively high turn armature giving a low cut-in speed, a second generator driven by the engine and having a relatively lower turn armature giving higher output when operated at high speeds, a storage battery, cut-out relays respectively connecting the battery with the generators, the first generator being cut-in ahead of the second one, and means responsive to engine speed for reducing to zero the output of the first generator to the battery.

2. An electrical generating system according to claim 1 in which an air switch actuated by an air current produced by the engine cooling fan causes the first generator to become inoperative to furnish current to the battery at a certain engine speed.

3. An electrical generating system for automotive vehicles comprising in combination a vehicle propelling engine, a generator driven by the engine and having a relatively high turn armature giving a low cut-in speed, a second generator driven by the engine and having a relatively lower turn armature giving higher output when operated at high speeds, a storage battery, cut-out relays respectively connecting the battery with the generators, the first generator being cut-in ahead of the second one, and means responsive to engine speed for inserting an external resistor in the field circuit of the first generator to reduce its output to the battery.

EDWARD M. CLAYTOR.